United States Patent
Dural

(10) Patent No.: US 12,200,645 B2
(45) Date of Patent: Jan. 14, 2025

(54) DISTRIBUTED UNIT TIMING SYNCHRONIZATION

(71) Applicant: Amazon Technologies, Inc., Seattle, WA (US)

(72) Inventor: Ozgur Dural, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 17/810,252

(22) Filed: Jun. 30, 2022

(65) Prior Publication Data

US 2024/0098666 A1    Mar. 21, 2024

(51) Int. Cl.
*H04W 56/00* (2009.01)
*H04L 7/00* (2006.01)

(52) U.S. Cl.
CPC ......... *H04W 56/003* (2013.01); *H04L 7/0008* (2013.01); *H04L 7/0037* (2013.01)

(58) Field of Classification Search
CPC ... H04W 56/003; H04L 7/0008; H04L 7/0037
USPC ........................................................ 370/350
See application file for complete search history.

(56) References Cited

U.S. PATENT DOCUMENTS

| 8,903,331 B2 * | 12/2014 | Nibe | H04W 52/48 |
| | | | 370/252 |
| 10,673,699 B2 * | 6/2020 | Wittberg | H04W 88/023 |
| 2019/0116568 A1 * | 4/2019 | Fertonani | H04W 56/00 |

FOREIGN PATENT DOCUMENTS

| EP | 3 169 087 A1 | 5/2017 |
| WO | WO 2021/080478 A1 | 4/2021 |
| WO | WO 2024/006633 A1 | 1/2024 |
| WO | WO 2024/006635 A1 | 1/2024 |

OTHER PUBLICATIONS

International Search Report and Written Opinion in PCT/US2023/068704 mailed Oct. 13, 2023 in 14 pages.
International Search Report and Written Opinion in PCT/US2023/068708 mailed Oct. 25, 2023 in 13 pages.
U.S. Appl. No. 17/810,258, Distributed Unit Workload Management, filed Jun. 30, 2022.

(Continued)

*Primary Examiner* — Christopher M Crutchfield
*Assistant Examiner* — Jean F Voltaire
(74) *Attorney, Agent, or Firm* — Knobbe, Martens, Olson & Bear, LLP

(57) ABSTRACT

Systems and methods are described for implementing a distributed unit in a radio access network that synchronizes its clock with a radio unit. A distributed unit may be deployed in a location where it cannot receive timing information from a satellite or may lack the equipment to obtain and process satellite signals. The clock of the distributed unit may thus drift relative to the clocks of the radio units, which may cause the distributed unit to mistime its transmissions of data to radio units for delivery to user devices. The distributed unit may prevent clock drift by obtaining timing information from the radio units, determining an amount of clock drift that is occurring, and applying a correction factor to keep the distributed unit clock synchronized with the radio unit clock. The distributed unit may determine how often to synchronize based on the severity and variability of the clock drift.

21 Claims, 9 Drawing Sheets

(56) References Cited

OTHER PUBLICATIONS

U.S. Appl. No. 17/810,270, Distributed Spectrum Broker, filed Jun. 30, 2022.
U.S. Appl. No. 17/810,262, Local Spectrum Controller, filed Jun. 30, 2022.

* cited by examiner

DISTRIBUTED UNIT TIMING SYNCHRONIZATION

BACKGROUND

Generally described, computing devices can be used to exchange information via a network. Computing devices may utilize a wireless network provided by a service provider to facilitate the exchange of information in accordance with one or more wireless communication protocols. For example, a service provider may maintain a wireless network that enables mobile computing devices to exchange information in accordance with a fourth-generation wireless telecommunications protocol, such as the Long Term Evolution ("LTE") protocol. The wireless network may be comprised of individual network components, such as radio units that transmit and receive radio signals within a particular geographic area, distributed units that transmit and receive data from radio units, and centralized units that connect distributed units to other communications networks. Radio units may thus receive data from distributed units and transmit the data to user devices, and vice versa.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
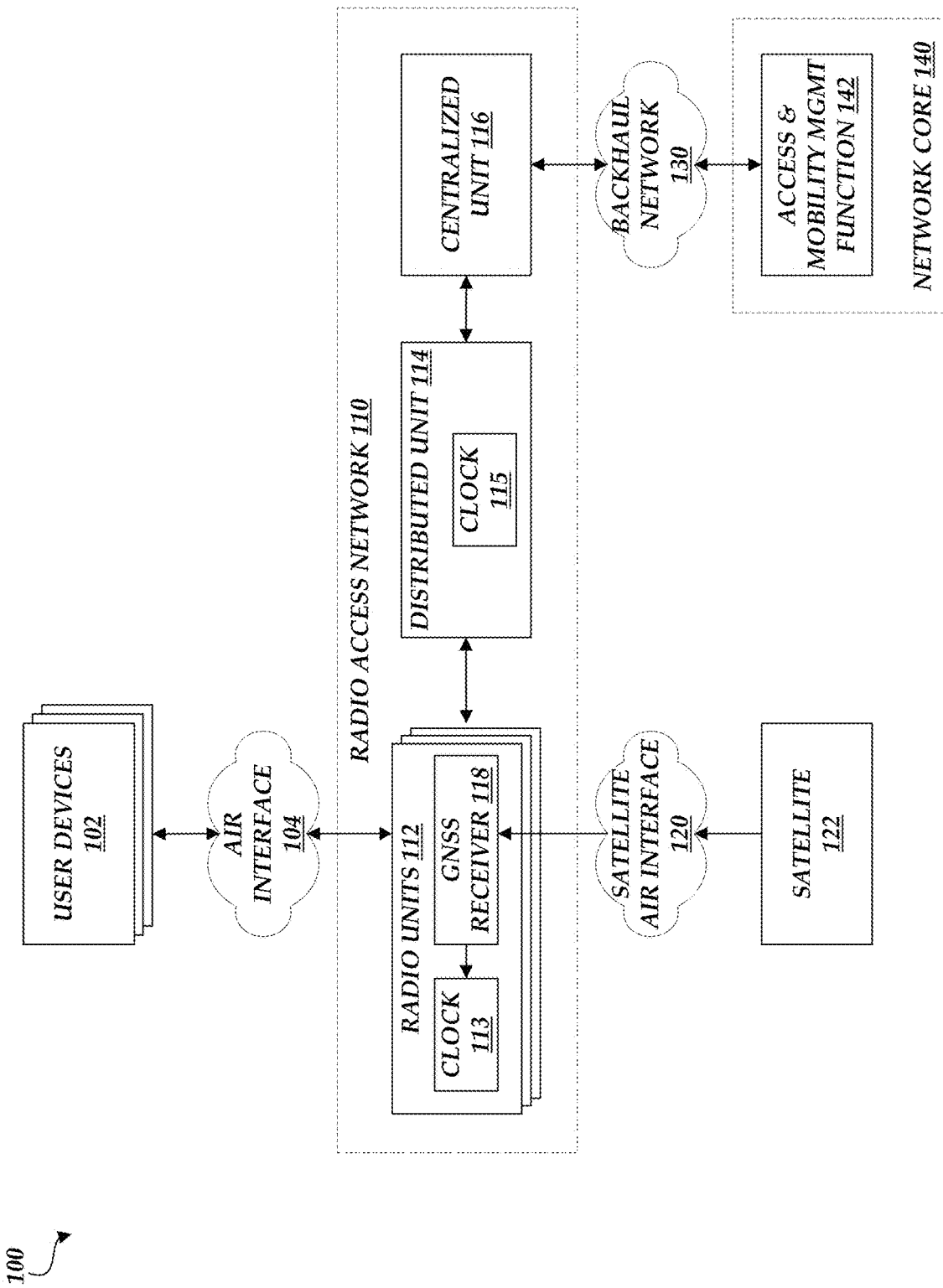
FIG. 1 is a block diagram depicting an example operating environment in which a distributed unit may synchronize its clock with a radio unit and manage its workload, and thereby transmit data to the radio unit without missing timeslots due to clock drift or overload, in accordance with aspects of the present disclosure.

Generally described, aspects of the present disclosure relate to improved timing synchronization and workload management in wireless communications networks. More specifically, aspects of the present disclosure are directed to systems, methods, and computer-readable media related to improving the performance of a distributed unit in a radio access network ("RAN"), such as an open radio access network, by ensuring that it does not miss timeslots for transmitting data to radio units of the RAN by synchronizing its clock with one or more radio units of the radio access network and managing its workload.

The functionality of a RAN may be split among various elements, such as radio units ("RUs"), distributed units ("DUs"), and centralized units ("CUs"). RUs may generally implement "layer 1" (which may be referred to herein as "L1") or "physical layer" functions related to the transmission and receipt of radio signals, such as converting encoded digital signals into radio waves and vice versa, transmitting and receiving the radio waves during specified timing windows and on specified frequencies, and so forth. An RU may be located in close proximity to amplifiers, filters, towers, antennas, and other hardware that are used to transmit and receive radio signals, and each RU may provide coverage to a different geographic area, which may partially overlap the areas of neighboring RUs in order to facilitate handoffs and provide seamless communication. DUs may generally receive data from CUs for delivery to RUs (and vice versa), and may process the data to encode or decode it, modulate or demodulate it, add or remove error correction or redundancy, or otherwise prepare data received from the CU for transmission over the air by the RU and vice versa. The functionality implemented by the DU may include some layer 1 functions, such as encoding the digital signals to be transmitted by the RU, adding redundancy and error correction codes to the digital signals, mapping transport channels to physical channels, and so forth. In some embodiments, the DU may include specialized hardware for performing layer 1 functions, such as an accelerator card that performs signal processing functions. The DU may also implement some "layer 2" (which may be referred to herein as "L2") functions, such as mapping logical channels to transport channels, determining the timing of the RU's digital signal transmissions within a timing window, and so forth. The CU, in turn, may implement "layer 3" ("L3") functions such as mediating access to external networks, authorizing access to the RAN, and so forth.

A distributed unit may thus receive data from a centralized unit, and may then transmit the data to a radio unit for delivery to a user device (e.g. a mobile device, which may be referred to as "user equipment" or "UE"). Conversely, the UE can send data to the RU, which can in turn be processed by the DU and then the CU. As described in more detail below, these elements may need to communicate with each other, or with user devices, during specified time windows (which may be referred to herein as "timeslots"). It may thus be important that, for example, the clocks of the distributed units and the radio units are synchronized so that communication occurs at the proper times. The timing synchronization in a cellular network may be an important element of the system not only to make the system function properly but also to achieve ever increasing data rates while decreasing latency, such as in 5G networks. 5G cellular systems have particularly tight synchronization requirements on the RAN side and on the device side. In order to fulfill these requirements, some 5G RAN deployments may use GPS on components such as RU, DU and CU. Each component can have its own GPS receiver, or one or more component can share the same GPS signal using protocols such as the Precision Time Protocol ("PTP"). PTP is designed to provide nanosecond precision for timing synchronization.

However, not all of the 5G components may require or have access to this high level of precision timing. In some implementations, the DU can be run on edge hardware of a cloud provider network provided to customer premises where the 5G network is needed, and a number of these DUs can positioned in a convenient location on the premises (e.g., in a temperature-controlled room). One or more RUs may be positioned remotely from the DU(s) as required for the desired network coverage, for example on or near a ceiling. For the RU, high precision timing can be critical since the RU is the component that sends the electromagnetic waves over the air interface to the UE. For the DU which provides the digital processing of the received and transmitted data, nanosecond precision may not be necessary. However, the DU has to produce data to be transmitted by the RU every slot boundary. The slot duration depends on the subcarrier spacing, with a 1 ms slot duration being typical of some implementations. Because of the tight integration between the DU and RU, it can be desirable to also have GPS provided timing information for the DU. However, it may be costly to have GPS receivers on every DU in a 5G network deployment, and this may also increase installation due to the requirement of connecting the GPS antenna to a place where it has good the coverage of GPS signals, because the DU may be located in an indoor facility with relatively poor GPS signal quality (or no signal at all). Further, PTP typically requires specialized hardware support to be able to achieve nanosecond precision. For example, PTP may rely at least in part on hardware-based timestamping of data transmissions. This requirement hinders the ability to use general purpose hardware in the DU and further increases its cost. An alternative to PTP is the Network Time Protocol ("NTP"), but the precision of NTP is in the 1-10 ms range, which is not acceptable in some scenarios. For example, this range may be impermissibly wide when compared to a typical timeslot duration, particularly for high-speed technologies such as 5G networks.

Accordingly, in some embodiments, these elements of the RAN may rely on different sources of timing information that have different levels of reliability, which may cause the elements to become unsynchronized and may lead to communication issues. For example, a radio unit may rely on a satellite network (e.g., the Global Positioning System, or "GPS") for timing information, but a distributed unit may be deployed at a location where GPS signals are not available and thus may rely on its own internal clock or a networked time server, which may drift relative to the GPS-synchronized clock of the radio unit. If no timing synchronization is performed on the DU, it is highly likely that the clock will drift to the point that the DU misses the slot boundary in which it has to deliver data to the RU. This may be result of the DU internal clock slowly shifting due to an imprecise (relative to PTP) local oscillator crystal or the temperature response of the crystal. When the DU does not provide the necessary data to the RU, there may be dead air on the system, because the RU does not receive any data in time for transmission in a certain slot. The RU may need to reset the connection to DU in such instances, which can cause all the devices connected to the RAN to lose their connections and have to start over by reconnecting to the network. As will be appreciated, this can result in very poor user experiences. The present disclosure addresses this problem by enabling a distribution unit to synchronize its clock with a radio unit, thereby ensuring that the distribution unit sends data to radio units at the expected times. The present disclosure provides multiple techniques to achieve the required synchronization while minimizing usage of the limited bandwidth between the RU and the DU, including an initial time synchronization and an ongoing time synchronization.

For an initial time synchronization, when an RU is connected to a DU for the first time and there is no load on the system, the DU can request timing information from the RU in fixed intervals with respect to its own clock, for some time period. The interval can be configured at both the RU and DU, or the DU may actively request timing information from the RU according to its own time. The RU can respond with packets including the requested timing information, and can hardware stamp them if the RU is capable of hardware stamping. The DU then can then estimate its own clock drift based on the responses from the RU. Allocating longer time durations for this time sync and transmitting a greater number packets can increase the precision of this estimation. Particular implementations can weigh increased estimation precision against the increased amount of time required for the synchronization to achieve the desired balance.

For the ongoing time synchronization, a similar procedure to the initial time synchronization may continue during operation of the RAN. In the ongoing time synchronization, an additional consideration in determining the frequency and duration of timing synchronizations is that the request/response takes up bandwidth between the RU and DU which is otherwise used for data packet transfer, and thus may impact the overall performance of the system in terms of the amount of data it is able to send and receive from UE. To mitigate this issue, in implementations which include multiple RUs connected to the same DU (for redundancy, increased area coverage, or increased device number support, for example) one of the RUs can be selected to perform timing synchronization with the DU. The RU selected for this purpose can be rotated, for example using a round robin or based on analysis of the load on the RUs. Another solution can be to have the RU send data packets on regular intervals such as slot boundaries which include timing information (and which may be hardware stamped), and to have the DU extract the timing information from some or all of the packets that it receives. The DU can use the timing information that it receives on a regular basis to correct its clock. Another consideration in determining the frequency and duration of ongoing timing synchronizations is that the DU's clock drift may vary during operation due to factors such as workload, temperature, or other conditions that may cause the amount of clock drift to become less predictable. The DU may therefore request timing synchronization more often when the DU's clock drift is less consistent, and may request timing synchronization less often when the DU's workload and other factors are such that its clock drift is predictable.

In some embodiments, a DU may also monitor and manage its workload to ensure that other tasks performed by the DU do not prevent it from sending data to the RU in time for the RU to transmit it in the next timeslot. The DU generally has other tasks to perform in addition to transmitting data to the RU. For example, the distributed unit receives and processes data from radio units when such data is generated and uploaded by UEs. As a further example, the DU may receive more data from the CU than it can process in a single timeslot. The DU may thus fail to transmit data to the RU in time, resulting in "dead air" (a timeslot in which no data is transmitted), less efficient use of the RU and radio spectrum, and a suboptimal user experience. In some embodiments, as described above, the RU may reset its connection to the DU if the DU fails to provide data in a timely fashion, which may cause UEs to stop receiving data for a longer duration. The DU may, in some embodiments, scale its capacity to meet its workload by increasing a number of parallel processing threads it is executing. However, increasing the number of threads may increase the time it takes to respond to individual UEs, and increasing the number of threads beyond the physical computing resources available at the DU may not result in a capacity increase.

As mentioned above, a radio unit may deliver data to user devices during specified timeslots. Timeslots may start at times based on the internal clock of the radio unit. For example, the radio unit may deliver data to user devices in timeslots that are each one millisecond in duration, and these timeslots may start and end at 12:00:00.000 p.m., 12:00:00.001, 12:00:00.002, and so forth according to clock of the radio unit. The radio units may set and synchronize their clocks by obtaining timing information from a satellite. For example, a radio unit may obtain timing information from a GPS satellite, which may provide highly accurate timing information that allows each radio unit to keep time consistently. This in turn allows the radio units to accurately determine the start and end of each timeslot for sending data to user devices.

In order to transmit data to user devices in each of its timeslots, the radio unit must receive the data to be transmitted from a distributed unit before the start of the timeslot. The distributed unit may therefore be required to also keep time consistently and accurately in order to determine the start of each of the radio unit's timeslots and deliver data to the radio unit before that time. However, a distributed unit may not have the capability to obtain timing information from a satellite. A radio unit is typically located in proximity to the antennas of a cell tower, and has the necessary equipment and programming to receive and process radio signals from a satellite. A distributed unit may be at a separate location from the antennas (e.g., an office, warehouse, or data center), and may not have the necessary equipment or programming to receive or process timing information from a satellite.

Accordingly, the clock of a distributed unit may keep time less accurately than the clock of a radio unit. For example, the clock of the distributed unit may rely on a crystal oscillator or other internal component, and the time kept by this component may vary according to factors such as the temperature of the crystal. As such, if the clock of the distributed unit "drifts" and keeps slower or faster time than the clock of the radio unit, then the drift will eventually cause the distributed unit to miss a timeslot for sending data to the radio unit, or to send more data than the radio unit can transmit in a given timeslot. These outcomes are undesirable because they lead to "dead air" (a timeslot in which no data is transmitted) or to dropped data packets that must be retried and resent. The radio unit may, in some embodiments, have a limited capacity to buffer data that is received from the distributed unit prematurely, which may allow the radio unit to temporarily compensate for a distributed unit with a clock that keeps faster time than the radio unit clock. Nevertheless, a distributed unit with a too-fast clock may eventually send more data than the radio unit can store. In other embodiments, the radio unit may reset its connection to the distributed unit if the distributed unit fails to provide data in a timely fashion, which may cause a user device or devices to stop receiving data for a longer duration.

Additionally, the DU has other tasks to perform in addition to transmitting data to the RU, which, if the DU's workload is sufficiently high, may prevent the DU from transmitting the data to the RU in a timely fashion. For example, the DU receives and processes data from RUs when such data is generated and uploaded by UEs. As a further example, the DU may receive more data from the CU than it can process in a single timeslot. The DU may thus fail to transmit data to the RU in time, which again may result in "dead air" and less efficient use of the RU and the radio spectrum.

To address these issues, an operator of a radio access network may implement a distributed unit that performs timing synchronization and manages its workload as described herein. As discussed in more detail below, the distributed unit described herein may synchronize its clock with the radio unit by obtaining timing information from the radio unit, may determine whether and to what degree its clock is drifting relative to the radio unit, and may apply a correction factor to keep its clock synchronized. The correction factor may be adjusted dynamically as the amount of clock drift varies (e.g., due to changes in the workload of the distribution unit, changes in the temperature of the distribution unit, etc.), and the distribution unit can determine how often to synchronize its clock with the radio unit based on factors such as radio unit workload, variability of the clock drift, and other criteria. Further, the distributed unit described herein may assess the risk that its workload will cause it to miss a window for transmitting data to a radio unit, and may take preventive actions to reduce its workload and mitigate the risk if it appears likely that the distributed unit will not be able to transmit data in time. In various embodiments, the distributed unit may, for example, offload processing tasks to another distributed unit, throttle or defer connections from the radio unit or the centralized unit, or cause the radio unit to throttle or defer connections.

It will be understood that the techniques described herein address technical problems that specifically arise in the realm of computer networks, and in particular addresses problems that arises in the realm of radio access networks when a distributed unit does not have access to GPS-based timing information (or, more generally, when a distributed unit does not have access to the same timing information that is used by the radio units of the radio access network), or when the workload of a distributed unit prevents it from making timely data transmissions to a radio unit. It will further be understood that the technical problems described herein are not analogous to any pre-Internet practice, and that the distributed unit described herein improves the performance of a radio access network by preventing dead air and packet loss. By implementing the distributed unit described herein, a wireless network operator may allow the distributed unit and the radio units to maintain synchronous clocks, and thereby prevent "dead air" or packet loss. The wireless network operator may thus use the techniques described herein to make more effective use of their radio access network and provide wireless telecommunications services more efficiently.

While the present disclosure makes reference to wireless standards such as 5G, it will be understood that the present disclosure is not limited to any particular wireless standard, and that embodiments of the present disclosure include other wireless standards and protocols that have similar characteristics with regard to timing (for example 4G, LTE, 6G, and the like). Similarly, although the present disclosure makes reference to particular components of a RAN, it will be understood that the present disclosure is not limited to these components and includes within its scope other components that may have similar issues with timing synchronization or workload. It will further be understood that the present disclosure is not limited to a particular source of precise timing information such as GPS. For example, the RU may obtain timing information from satellites other than GPS satellites, or from land-based sources of precise timing information.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1 is a block diagram of an example operating environment in which a distributed unit 114 of a radio access network 110 may operate based on communication with radio units 112 and a centralized unit 116 of the radio access network 110. The radio units 112 in turn may communicate with user devices 102 via an air interface 104, and may receive timing information and other signals from a satellite 122 (e.g., a GPS satellite) via a global navigation satellite system ("GNSS") receiver 118 and satellite air interface 120. In some embodiments, the radio units 112 may communicate directly or indirectly with other satellites. For example, the radio units 112 may communicate with satellites in low earth orbit that deliver telecommunications services to the user devices 102 via a satellite terminal or other interface. The centralized unit 116 may communicate with a network core 140 via a backhaul network 130. The network core 140 may in turn communicate with devices on external networks, enabling communication between, e.g., user devices 102 and servers or other computing devices on the Internet.

In general, the user devices 102 can be any device that is operable to communicate via the air interface 104. Examples of user devices 102 include mobile phones, tablet computing devices, laptop computing devices, wearable computing devices, desktop computing devices, personal digital assistants (PDAs), hybrid PDAs/mobile phones, electronic book readers, set-top boxes, voice command devices, cameras, digital media players, servers, and the like. The air interface 104 may illustratively be an over-the-air interface to any wireless network, including but not limited to a cellular telecommunications network, Wi-Fi network, mesh network, personal area network, or any combination thereof. In some embodiments, the air interface 104 may be an interface to a Global System for Mobile Communications (GSM) network, Code Division Multiple Access (CDMA) network, Long Term Evolution (LTE) network, or combinations thereof. The satellite 122 can generally be any satellite that provides accurate timing information to ground-based devices via a satellite air interface 120. Examples of a satellite 122 and a satellite air interface 120 include, but are not limited to, a Global Positioning System ("GPS") satellite and the radio frequencies with which it communicates to ground-based devices. In some embodiments, the radio units 112 may communicate with other networks or devices (e.g., atomic clocks) to obtain timing information. As used herein, "timing information" may generally refer to any information that enables the radio unit 112 to determine the current absolute time, and/or that enables the distributed unit 114 to determine the current clock setting of the radio unit 112 (which, in some embodiments, may be set to the current absolute time).

The radio units 112 obtain timing information from a satellite or satellites 122 over the satellite air interface 120 using the GNSS receiver 118, which may generally be any receiver that is operable to receive timing information from the satellite 122 over the satellite air interface 120. As described above, the radio units 112 may use timing information obtained from the satellite 122 to set and synchronize the clock 113 of the radio unit 112. The radio unit 112 may thereby deliver data to user devices 102 at precise intervals, which may mitigate or prevent radio interference as multiple radio units 112 deliver data to multiple user devices 102. The radio units 112 transmit and receive data from user devices 102 via the air interface 104, and serve as the endpoint for these user devices 102 to access the network core 140 via the radio access network 110 and the backhaul network 130. The radio units 112 may correspond to base stations of a cellular telephone network, or in some embodiments may be deployed separately or independently from any existing cellular telephone network. In some embodiments, multiple radio units 112 may communicate with a single distributed unit 114, and multiple distributed units 114 may in turn communicate with a single centralized unit 116.

The distributed unit 114 is described in more detail below with reference to FIG. 6, and is generally responsible for the physical layer and at least some aspects of the data link layer of the radio access network 110. The distributed unit 114 receives data from the centralized unit 116 and transmits the data to the radio units 112 for delivery to the user devices 102. As discussed above, in order to make full use of the timeslots during which the radio unit delivers data to user devices 102, the distributed unit 114 must deliver an appropriate amount of data to the radio unit 112 before the start of each timeslot. This in turn requires that the clock 115 of the distributed unit 114 remain consistent with the clock 113 of the radio unit 112, which in turn requires that the distributed unit 114 implement the functionality described herein if it cannot obtain timing information from the satellite 122. Delivering data to the radio unit 112 before the start of each timeslot also requires that the distributed unit 114 manage its workload in order to ensure it has sufficient capacity to transmit the data at the appropriate time.

The centralized unit 116 is responsible for the network layer functions of the radio access network 110, and provides communication with other computing devices via a backhaul network 130 and network core 140. The backhaul network 130 may illustratively be any wired or wireless network or combination thereof. In addition, the backhaul network 130 may include, but is not limited to, the Internet, public or private intranets, cellular telecommunications networks, Wi-Fi networks, cable networks, satellite networks, mesh networks, personal area networks, local area networks (LANs), wide area networks (WANs), or other public or private communications network or networks, or any combination thereof. In some embodiments, the backhaul network 130 may be fully or partially implemented within a cloud provider network, as described in more detail below.

The radio units 112, distributed unit 114, and centralized unit 116 are collectively referred to as an "open" radio access network 110, and split the functions of a monolithic baseband unit into modular components that provide distinct functionality and can be sourced from multiple vendors. In some embodiments, all or part of the radio access network 110 may be implemented using a cloud provider network. A cloud provider network (sometimes referred to simply as a "cloud") refers to a pool of network-accessible computing resources (such as compute, storage, and networking resources, applications, and services), which may be virtualized or provided as "bare metal" hardware. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network can provide on-demand, scalable computing platforms to users through a network, for example allowing users to have at their disposal scalable "virtual computing devices", also referred to as virtual computing instances, via their use of the compute servers (which provide compute instances via the usage of one or both of CPUs and GPUs, optionally with local storage) and block store servers (which provide virtualized persistent block storage for designated compute instances). These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface (API) refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network). Transit Centers (TC) are the primary backbone locations linking customers to the cloud provider network, and may be co-located at other network provider facilities (e.g., Internet service providers, telecommunications providers). Each region can operate two TCs for redundancy.

The cloud provider network can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network, for example it may not be possible to route from a substrate network address to an address in a production network that runs services of the cloud provider, or to a customer network that hosts customer resources.

The cloud provider network can also include an overlay network of virtualized computing resources that run on the substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane includes customer resources that are implemented on the provider network (e.g., computing instances, containers, block storage volumes, databases, file storage). Data plane traffic generally includes non-administrative operations such as transferring data to and from the customer resources.

The data plane can include one or more compute servers, which may be bare metal (e.g., single tenant) or may be virtualized by a hypervisor to run multiple VMs (sometimes referred to as "instances") for one or more customers. These compute servers can support a virtualized computing service of the provider network. The provider may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

Some customers may desire to use the resources and services of the cloud provider network, but for various reasons (e.g., latency in communications with customer devices, legal compliance, security, or other reasons) prefer for these resources and services to be provisioned within their own network, for example on premises of the customer. The technology described herein enables a piece of the cloud provider network—referred to herein as a "provider substrate extension" or PSE—to be provisioned within the customer's network. A customer may access their PSE via the cloud provider substrate or their own network, and may use the same APIs to create and manage resources in the PSE as they would use to create and manage resources in the region.

The PSE may be pre-configured, e.g. by the provider network operator, with the appropriate combination of hardware with software and/or firmware elements to support various types of computing-related resources, and to do so in a manner that mirrors the experience of using the provider network. For example, one or more PSE servers can be provisioned by the cloud provider within the customer network. As described above, the provider network may offer a set of predefined instance types, each having varying types and quantities of underlying hardware resources. Each instance type may also be offered in various sizes. In order to enable customers to continue using the same instance types and sizes in their PSE as they do in the region, the PSE server can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server, meaning while other VMs are still running and consuming other capacity of the PSE server. This can improve utilization of resources within the PSE by allowing for better packing of running instances on physical hosts, and also provides a seamless experience regarding instance usage across the region and PSE.

In one embodiment, PSE servers can host one or more VMs. The customer can use these VMs to host containers, which package up code and all its dependencies so an application can run quickly and reliably from one computing environment to another. In addition, the PSE servers may host one or more data volumes, if desired by the customer. In the region, such volumes may be hosted on dedicated block store servers. However, due to the possibility of having a significantly smaller capacity in the PSE than in the region, it may not provide an optimal utilization experience if the PSE includes such dedicated block store servers. Accordingly, the block storage service may be virtualized in the PSE, such that one of the VMs runs the block store software and stores the data of the volume. Similar to the operation of the block storage service in the region, the volumes within a PSE may be replicated for durability and availability. The volumes may be provisioned within their own VPC within the PSE. The VMs and any volumes collectively make up an extension of the provider network data plane within the PSE.

The PSE servers may, in some implementations, host certain local control plane components, for example components that enable the PSE to continue functioning if there is a break in the connection back to the region. Examples of these components include a migration manager that can move VMs between PSE servers if needed to maintain availability, a key value data store that indicates where volume replicas are located, and a local VM placement component that can respond to requests for new VMs made via the customer network. However, generally the control plane for the PSE will remain in the region, in order to allow the customer to use as much capacity of the PSE as possible. At least some VMs that are set up at the PSE, and associated higher-level services that use such VMs as building blocks, may continue to function even during periods of time when connectivity to the provider network data centers is temporarily disrupted in some embodiments.

In the manner described above, the PSE forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more.

In some embodiments, all or part of the radio access network 110 may be implemented on edge location hardware that may for example be physically closer to devices such as the RUs and UEs. In some embodiments, an edge location may be a provider substrate extension formed by one or more servers located on-premises at a customer or partner facility. The server(s) may communicate over a network (e.g., a publicly-accessible network such as the Internet) with a nearby availability zone or region of the cloud provider network. This type of provider substrate extension may be referred to as an "outpost" of the cloud provider network. Some outposts may be integrated into communications networks. For example, an outpost may be integrated into a base station within a telecommunications network or co-located with an RU of the network. The limited capacity of an on-premises outpost may be available for use only by the customer who owns the premises (and any other accounts allowed by the customer). Similarly, the limited capacity of an outpost integrated into a telecommunications network may be shared among a number of applications (e.g., games, virtual reality applications, healthcare applications) that send data to users of the telecommunications network. An outpost integrated into a telecommunications network may also include data plane capacity, which may be controlled at least partly by a control plane implemented in a nearby availability zone of the cloud provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations.

The radio access network 110 may thus communicate with a network core 140 that, in various embodiments, is implemented in a nearby availability zone of a cloud provider network, in an on-premises edge location, at another edge location, or on other network-accessible computing resources. For example, the network core 140 may be implemented using spare capacity of an outpost that implements RAN functionality, or on a separate outpost. The backhaul network 130 may similarly be partially or fully implemented on a cloud provider network, in various embodiments. The network core 140 provides control plane functionality, as described above, and performs management and control functions for the telecommunications network, such as authenticating subscribers, applying usage policies, managing UE sessions, and other control plane functions. The network core 140 includes, for example, an access and mobility management function 142, which may control the workload of the distributed unit 114 and may be used to manage the workload of the distributed unit 114 as described in more detail below. In some embodiments, the network core 140 may support multiple RANs, and may further support RANs from multiple tenants or customers. In other embodiments, the network core 140 may be implemented on dedicated computing resources for a particular wireless network operator, which may be provided on premises or within the cloud provider network.

It will be understood that the radio access network 110, network core 140, and other elements of the example operating environment 100 may include more (or fewer) components than those depicted in FIG. 1. It is not necessary, however, that all of these generally conventional elements be shown in order to provide an enabling disclosure.

Figure 2:
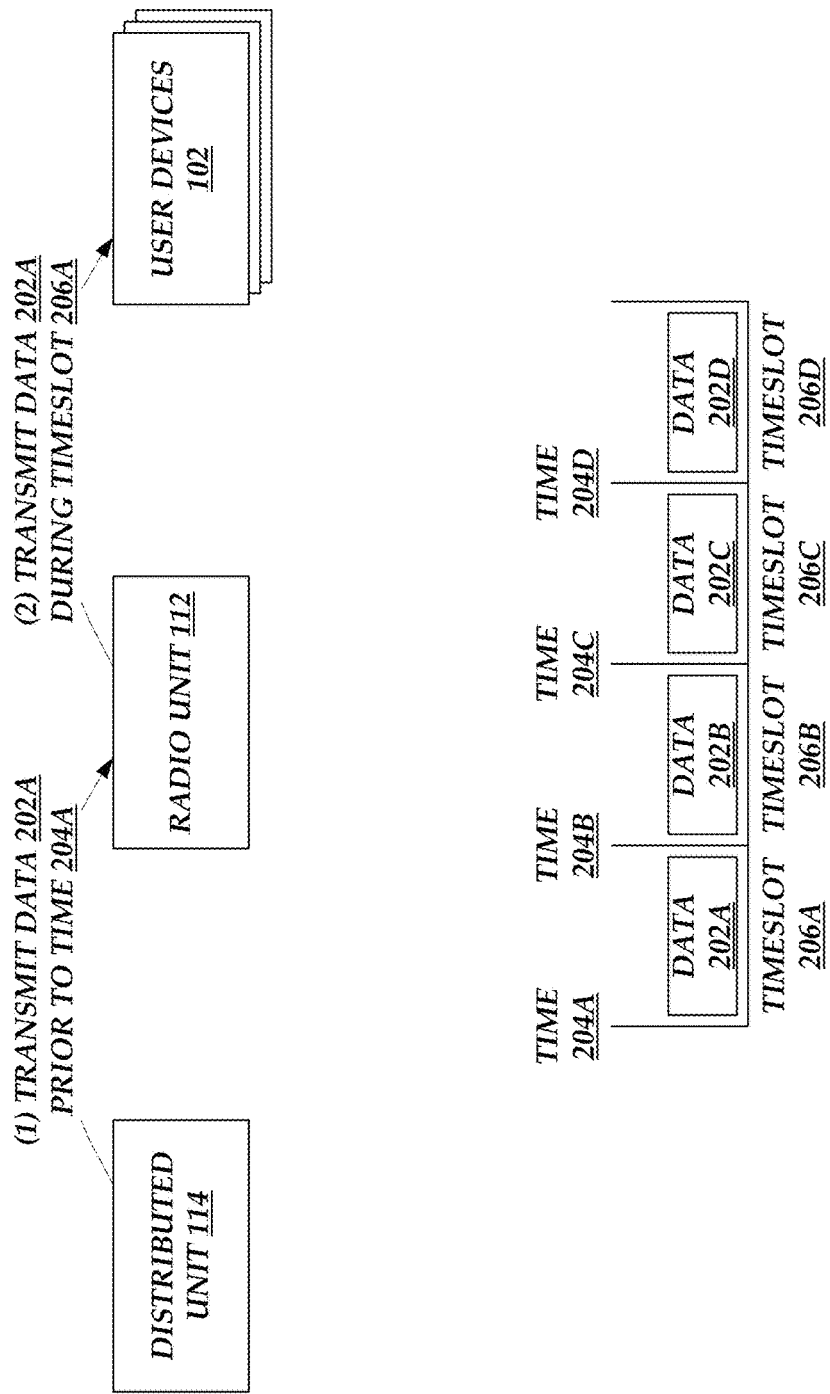
FIG. 2 is a flow diagram depicting example interactions and timing for transmitting data from a distributed unit to a radio unit in accordance with aspects of the present disclosure.

FIG. 2 is a flow diagram depicting example interactions for transmitting data from a distributed unit 114 to a radio unit 112 for delivery to user devices 102 in accordance with aspects of the present disclosure. Illustratively, the interactions depicted in FIG. 2, if performed at times that are synchronized between the distributed unit 114 and the radio unit 112 using the techniques described herein, allow the distributed unit 114 to supply data to the radio unit 112 at a rate that allows each of the timeslots 206A-D to be utilized, without providing excess data or failing to provide data for one of the timeslots 206A-D. At (1), the distributed unit 114 transmits data 202A to radio unit 112 prior to time 204A. In the illustrated embodiment, time 204A corresponds to the start of timeslot 206A, which is a time interval (e.g., 1 millisecond) during which the radio unit 112 transmits the data 202A over the air to user devices 102. The data 202A must therefore be delivered to the radio unit 112 prior to time 204A, so that it is available to the radio unit 112 in time to be delivered to user devices 102 during timeslot 206A. In some embodiments, the time 204A may precede the start of the timeslot 206A by an interval (e.g., 0.2 milliseconds), which may represent an amount of time that the radio unit 112 requires for receiving and processing the data 202A prior to delivering it over the air to the user devices 102.

At (2), the radio unit 112 transmits the data 202A over the air to the user devices 102 during the timeslot 206A. The interactions at (1) and (2) are then repeated for data 202B, time 204B, and timeslot 206B, further repeated for data 202C, time 204C, and timeslot 206C, still further repeated for data 202D, time 204D, and timeslot 206D, and so forth indefinitely. Because these interactions are repeated on a relatively small timescale, the distributed unit 114 must keep its internal clock synchronized with the internal clock of the radio unit 112, so that both the distributed unit 114 and the radio unit 112 agree on the value of time 204A, time 204B, time 204C, and so forth. In particular, if the clock of the distributed unit 114 "drifts" relative to the clock of the radio unit 112, such that, e.g., 1.0 milliseconds elapse on the clock of the distributed unit 114 while 1.1 milliseconds elapse on the clock of the radio unit 112, then the eventual result will be that the distributed unit 114 misses one of its windows for delivering data to the radio unit 112. Missing the window results in "dead air" during which the radio unit 112 is not delivering data to the user devices 102, and in some embodiments may lead to the radio unit 112 resetting the connection to the distributed unit 114 or a user device 102, which may further interrupt delivery of data to the user device 102. Similarly, if the clock of the distributed unit 114 is faster than the clock of the radio unit 112 (e.g., if 1.0 milliseconds elapse on the clock of the distributed unit 114 while 0.9 milliseconds elapse on the clock of the radio unit), then the distributed unit 114 may send more data than the radio unit 112 can transmit or buffer during one of the timeslots 206A-D. It is therefore desirable that the clocks of the distributed unit 114 and the radio unit 112 be kept in synchronization, which may be achieved using the techniques described herein.

In addition to keeping the clocks of the distributed unit 114 and the radio unit 112 in synchronization, the distributed unit 114 must ensure that it has sufficient capacity to perform the interaction at (1) prior to each of the times 204A-D. If the distributed unit 114 falls behind due to excess workload, it will miss one of its windows for delivering data to the radio unit 112, which may again result in "dead air" and inefficient use of computing resources and radio spectrum. It is therefore desirable that the distributed unit 114 manage its workload such that it has sufficient resources to transmit data 202A-D to the radio unit 112 in time, which may be achieved using the techniques described herein.

Figure 3:
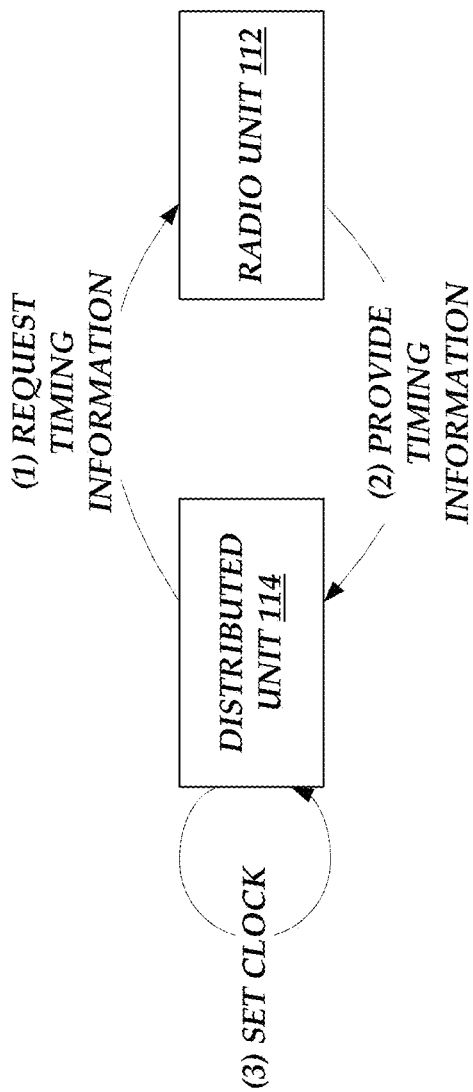
FIG. 3 is a flow diagram depicting example interactions for initially synchronizing the clocks of a distributed unit and a radio unit in accordance with aspects of the present disclosure.

FIG. 3 is a flow diagram depicting example interactions for initially setting the clock of the distributed unit 114 in accordance with aspects of the present disclosure. These interactions initially synchronize the clock of the distributed unit 114 with the clock of the radio unit 112, and thus establish a baseline for measuring drift and determining correction factors. At (1), the distributed unit 114 requests timing information from the radio unit 112. As discussed above, the radio unit 112 sets and maintains its clock based on timing information obtained from the satellite 122, and thus keeps time to a higher degree of accuracy than the distributed unit 114. In some embodiments, the distributed unit 114 may select the radio unit 112 from a plurality of radio units with which it communicates, and may select the radio unit 112 based on factors such as radio unit workloads (e.g., by selecting the radio unit 112 as the "least busy" of a set of radio units). At (2), the radio unit 112 provides the requested timing information, which the distributed unit 114 uses at (3) to initially set its clock. In some embodiments, the radio unit 112 may provide timing information to the distributed unit 114 without receiving an explicit request at (1). For example, the radio unit 112 may transmit data packets to the distributed unit 114 using the Enhanced Common Public Radio Interface ("eCPRI") protocol, and may timestamp the data packets that it transmits. In some embodiments, the radio unit 112 may include a network interface card or other component that supports hardware timestamping, and may thus include a hardware timestamp in the transmitted data packets. The distributed unit 114 may then derive the setting of the radio unit 112 clock from the timestamps. In such embodiments, the interaction at (1) may be omitted and the distributed unit 114 may set its clock based on the information received.

The timing information received from the radio unit 112 may generally include any information that allows the distributed unit 114 to accurately determine the setting of the internal clock of the radio unit 112 and set its own internal clock to match that of the radio unit. In some embodiments, the timing information may include information that allows the distributed unit 114 to determine the time delay between the radio unit 112 transmitting the timing information and the distributed unit 114 receiving the timing information. The distributed unit 114 may thus set its clock to compensate for the time delay (e.g., by setting its clock "ahead" of the radio unit 112 by the amount of the time delay). In some embodiments, the distributed unit 114 may carry out the interactions at (1) and (2) repeatedly (e.g., for a specified time period) before carrying out the interaction at (3), and may initially set its clock (and, in some embodiments, determine an initial correction factor as described below) based on multiple responses to requests for timing information. In further embodiments, the distributed unit 114 may determine a number of times or an amount to time to spend carrying out the interactions at (1) and (2), and may make this determination based on factors such as a desired estimation precision or an amount of time initially allocated for clock synchronization.

Figure 4:
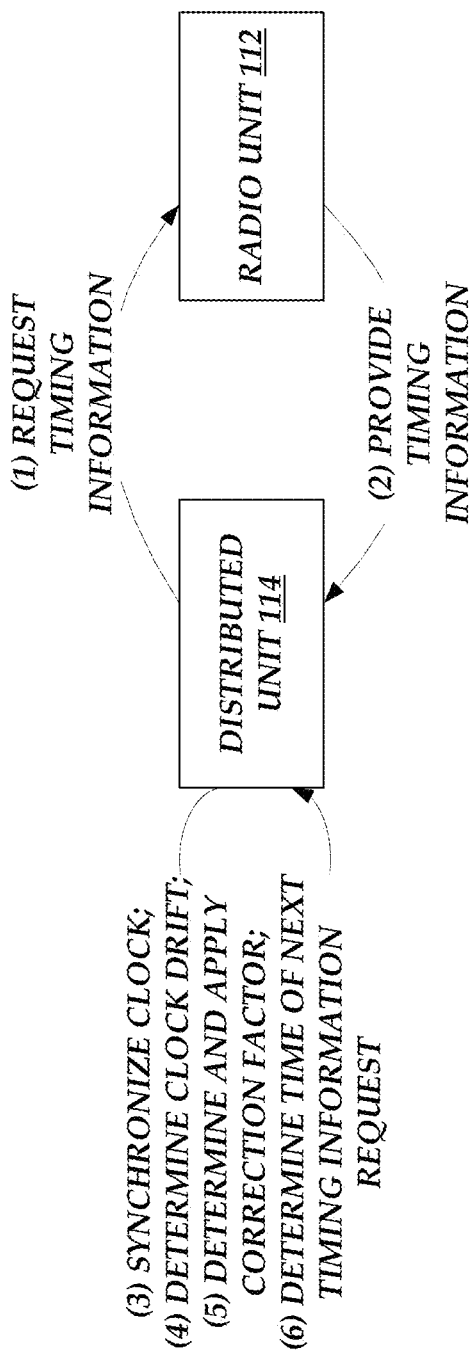
FIG. 4 is a flow diagram depicting example interactions for maintaining synchronization between the clocks of a distributed unit and a radio unit in accordance with aspects of the present disclosure.

FIG. 4 is a flow diagram depicting example interactions for keeping the clock of the distributed unit 114 consistent with the clock of the radio unit 112, and for determining how often to synchronize and apply correction factors to the clock of the distributed unit 114, in accordance with aspects of the present disclosure. As discussed in more detail above, keeping the clock of the distributed unit 114 synchronized with the clock of the radio unit 112 enables timely delivery of data from the distributed unit 114 to the radio unit 112, such that the radio unit 112 can make full use of its available timeslots for transmitting data to user devices 102 and does not receive more data than it can transmit during a timeslot. At (1), the distributed unit may again request timing information from the radio unit 112. In some embodiments, as described above, the interaction at (1) may be omitted and the radio unit 112 may provide timing information without an explicit request. At (2), the radio unit 112 provides the requested timing information, and at (3) the distributed unit 114 re-synchronizes its clock with the clock of the radio unit 112. As discussed above, the radio unit 112 may, in some embodiments, provide timing information including hardware timestamps, information obtained from GPS satellites or other external timing sources, or other timing information.

At (4), the distributed unit 114 determines whether its internal clock is drifting relative to the clock of the radio unit 112, and if so determines an amount and direction of the drift. For example, the determination may be that the clock of the distributed unit 114 is running more slowly than the clock of the radio unit 112, such that 0.9 milliseconds elapse on the clock of the distributed unit 114 for every 1.0 milliseconds that elapse on the clock of the radio unit 112. As a further example, the distributed unit 114 may determine that its clock is running faster, such that 1.12 milliseconds elapse on the clock of the distributed unit 114 for every 1.0 milliseconds that elapse on the clock of the radio unit 112. In some embodiments, the interactions at (1) and (2) may be repeated a number of times, and an average or median drift may be determined based on timing information collected from the radio unit 112 at a plurality of times. In further embodiments, the timing information collected from the radio unit 112 may be filtered to remove outliers, such as outliers that are determined to be caused by network delay.

At (5), the distributed unit 114 determines and begins applying a correction factor in order to keep its internal clock consistent with the clock of the radio unit 112. In some embodiments, the correction factor may be an amount of time to add or subtract from the clock after every millisecond elapsed. For example, the correction factor may be to add 0.1 milliseconds for every millisecond that has elapsed on the distributed unit 114 clock since the last time clocks were synchronized, or to subtract 0.12 milliseconds for every millisecond that has elapsed. In other embodiments, the correction factor may be a multiplier or a percentage. The distributed unit 114 may apply the correction factor to its clock, or in some embodiments may apply the correction factor while determining when to send data to the radio unit 112. In some embodiments, the interaction at (3) may be omitted or combined with the interaction at (5). For example, the distributed unit 114 may at (4) determine that the clock of the distributed unit 114 is currently 0.11 milliseconds slower than the clock of the radio unit 112, and at (5) may begin applying a correction factor of 0.11 milliseconds every millisecond. The first application of the correction factor thus synchronizes the clock of the distributed unit 114 with the clock of the radio unit 112. In other embodiments, the interaction at (3) may be carried out after either or both of the interactions at (4) and (5). For example, the correction factor may be a value other than the delta between the two clocks, and the clocks may be resynchronized based on the timing information obtained at (2) before or after applying a correction factor.

At (6), the distributed unit 114 may determine a time at which to send a further request for timing information to the radio unit 112 (or, in some embodiments, may determine when to re-analyze the timing information it passively receives from the radio unit 112). Illustratively, the determination of when to send a further request for timing information and re-synchronize may be based on an assessment of the degree to which the clock drift of the distributed unit 114 is stable and consistent over time. In some embodiments, the clock drift may vary based on factors such as the workload of the distributed unit 114, temperature of the distributed unit 114, or changes in the workload of the distributed unit 114 over time. For example, if the workload of the distributed unit 114 is relatively constant, the distributed unit 114 may determine that its clock drift is relatively stable and it can defer sending its next request for timing information for a relatively long interval (e.g., three to five seconds). In some embodiments, the distributed unit 114 may collect workload metrics, such as processor utilization, memory consumption, and the like, to assess the stability of its workload. In other embodiments, the next request for timing information may be triggered by an event, such as processor utilization exceeding a threshold, or may be based on an estimated reliability of the correction factor. For example, if the correction factor is determined based on an average of multiple drift measurements, the reliability of the correction factor may be estimated based on the standard deviation of the drift measurements.

In some embodiments, the distributed unit 114 may consider the workload of the radio unit 112 when determining whether and when to send further requests for timing information to the radio unit 112. For example, the distributed unit 114 may consider whether requests for timing information would consume bandwidth that would otherwise be used for data packet transfer, and may defer transmitting requests for timing information (or, in some embodiments, may transmit requests for timing information to a different radio unit) if the radio unit 112 is busy or its performance would otherwise be impacted. In further embodiments, the distributed unit 114 may identify a radio unit with sufficient capacity to respond to timing information requests among multiple radio units that are connected to the distributed unit 114, or may distribute requests for timing information to multiple radio units on a round-robin or other algorithmic basis. In other embodiments, the radio unit 112 may periodically send timing information to the distributed unit 114 regardless of whether it receives a request from the distributed unit 114, and the distributed unit 114 may determine a time to make a request at (6) only if the interval between periodic receipts of timing information is long enough that the clock of the distributed unit 114 might drift out of sync in between. In further embodiments, the radio unit 112 may periodically send timing information more often than the distributed unit 114 needs it, and the distributed unit 114 may at (6) determine which periodically received timing information to process and which to discard.

The distributed unit 114 may then, at the time determined at (6), repeat the interaction at (1) to obtain further timing information from the radio unit 112, and then carry out the interactions at (3), (4), (5), and (6) iteratively to maintain synchronization of the clock of the distributed unit 114 with the clock of the radio unit 112. By maintaining clock synchronization in the aforementioned manner, the distributed unit 114 may ensure that it transmits data to the radio unit 112 at times that allow the radio unit 112 to make full use of the available timeslots for transmitting the data over the air to user devices.

It will be understood that FIG. 4 is provided for purposes of example, and that many variations on the depicted interactions are within the scope of the present disclosure. For example, the interactions at (3) and (4) may be carried out in either order or in parallel. As a further example, the interactions at (1), (2), (3), and (4) may be carried out a number of times before the interactions at (5) and (6) are carried out, and the correction factor determined and applied at (5) may be based on an average clock drift across a number of measurements. Still further, in some embodiments, the correction factor and the time at which to make the next timing information request may be determined based on other factors in addition to the current clock drift, such as forecasted workload or a trend in the operating temperature of the processor of the distributed unit 114. FIG. 4 is thus understood to be illustrative and not limiting.

Figure 5:
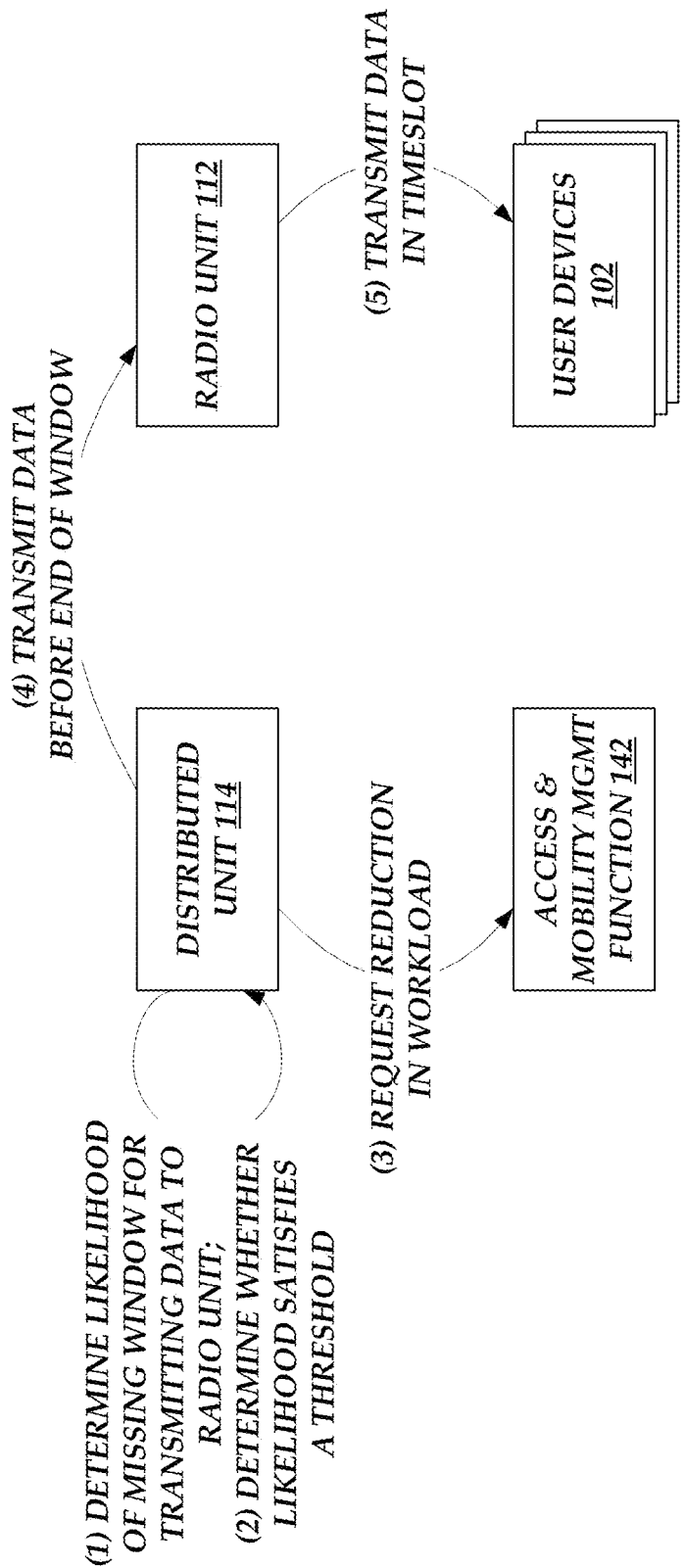
FIG. 5 is a flow diagram depicting example interactions for managing the workload of a distributed unit to reduce the risk that it misses a data transmission window for transmitting data to a radio unit, in accordance with aspects of the present disclosure.

FIG. 5 is a flow diagram depicting example interactions for managing the workload of the distributed unit 114 in accordance with aspects of the present disclosure. These interactions reduce the risk that the workload of the distributed unit 114 will increase to a level that prevents the distributed unit 114 from timely transmitting data to the radio unit 112. At (1), the distributed unit 114 determines a likelihood of missing the next window for transmitting data to the radio unit 112. As discussed above, the window in which the distributed unit 114 should transmit data to the radio unit 112 precedes the timeslot in which the radio unit transmits the data to user devices 102. In some embodiments, the window may precede the timeslot by a fixed amount, which may represent the time needed by the radio unit 112 to process the received data and prepare the data transmission. In other embodiments, the determination at (1) may be a likelihood that a deadline (e.g., the end of the window) will be missed.

In some embodiments, the determination at (1) may be performed by estimating the time at which the distributed unit 114 will transmit the data to the radio unit 112. The determination may be based on, for example, historical times at which the distributed unit 114 has transmitted data to the radio unit 112, information regarding the historical workload of the distributed unit 114, information regarding a current workload of the distributed unit 114, or other information that can be used to estimate the time at which the distributed unit 114 will next transmit data. For example, the distributed unit 114 may estimate, based on its current memory usage, processor utilization, and the amount of data remaining to process before it can be transmitted, that the distributed unit 114 will transmit the data in 450 nanoseconds. In other embodiments, the determination at (1) may be performed by estimating a likelihood that the distributed unit 114 will miss a deadline for transmitting the data to the radio unit 112, or by determining a confidence level that the distributed unit 114 will transmit the data by the deadline. In some embodiments, a machine learning model trained on historical workload information and historical data transmission times may be used to make the determination.

At (2), the distributed unit 114 may determine whether the likelihood satisfies a threshold. For example, the distributed unit 114 may determine whether the estimated time at which data will be transmitted is within a threshold time interval (e.g., 50 nanoseconds) of the end of the window. As further examples, the distributed unit 114 may determine whether its estimated likelihood of missing the deadline has exceeded a threshold (e.g., 10%), or whether its confidence level that it will meet the deadline has fallen below a threshold (e.g., 80%). In some embodiments, the interactions at (1) and (2) may be combined, and the determination at (1) may be, for example, a determination of whether there is at least a 20% likelihood of missing the data transmission window.

In embodiments where the determination at (2) is that the distributed unit 114 has an unacceptable risk of missing the data transmission window, the distributed unit 114 may, in some embodiments, request at (3) that an access and mobility management function 142 reduce the workload of the distributed unit 114. As described in more detail below with reference to FIG. 8, the access and mobility management function 142 may reduce the workload of the distributed unit 114 by denying or redirecting (e.g., to another distributed unit 114) new requests for services from the user devices 102. In some embodiments, the distributed unit 114 may instead reduce its own workload by denying new requests for services from the user devices 102, throttling (e.g., limiting the data throughput of) services being provided to the user devices 102, causing existing services to be handed off to another distributed unit 114, or otherwise modifying its workload. In other embodiments (e.g., cloud computing environments), the distributed unit 114 may obtain additional computing resources and increase its capacity rather than reducing the workload. Additionally, in some embodiments, the access and mobility management function 142 may obtain workload information from the distributed unit 114, perform the interactions at (1) and (2), and make its own determination of whether to reduce or rebalance the workload of the distributed unit.

At (4), the distributed unit 114 transmits data to the radio unit 112 before the end of the data transmission window. The interaction at (4) may illustratively be carried out before or in parallel to the interactions at (1), (2), and (3), and in some embodiments the interaction at (4) may be prioritized over the other interactions to ensure that the distributed unit 114 meets the deadline for transmitting data to the radio unit 112. At (5), the radio unit 112 may transmit the data received from the distributed unit 114 to one or more user devices 102 during the timeslot. The interactions depicted in FIG. 5 may then be carried out for the next timeslot and the next deadline, and may carried out iteratively while the distributed unit 114 remains in service. In some embodiments, the interactions at (1), (2), and (3) may be carried out less frequently than the interactions at (4) and (5). For example, the interactions at (1) and (2) may be carried out one time for every ten times that the interactions at (4) and (5) are carried out, and the interaction at (3) may be carried out on an as-needed basis if the determination at (2) is that the distributed unit 114 is at an unacceptably high risk of missing deadlines for transmitting data to the radio unit 112. In some embodiments, the distributed unit 114 may make the determination at (1) based on average times at which the distributed unit 114 transmits data to the radio unit 112, average workload metrics, peak workloads, worst times, or other measurements that are collected and aggregated across a number of timeslots. In other embodiments, the distributed unit 114 may identify trends in data collected across a number of timeslots (e.g., that the distributed unit 114 is getting closer to missing the window) and may make the determination at (2) based on these trends.

It will be understood that FIG. 5 is provided for purposes of example, and that many variations on the depicted interactions are within the scope of the present disclosure. For example, the interaction at (3) may be carried after or in parallel with the interaction at (4), in order to increase the likelihood that the distributed unit 114 transmits the data before the end of the window. As a further example, the distributed unit 114 may determine whether it is possible to increase its capacity rather than requesting a reduction in workload, and if so then the interaction at (3) may be omitted. FIG. 5 is thus understood to be illustrative and not limiting.

Figure 6:
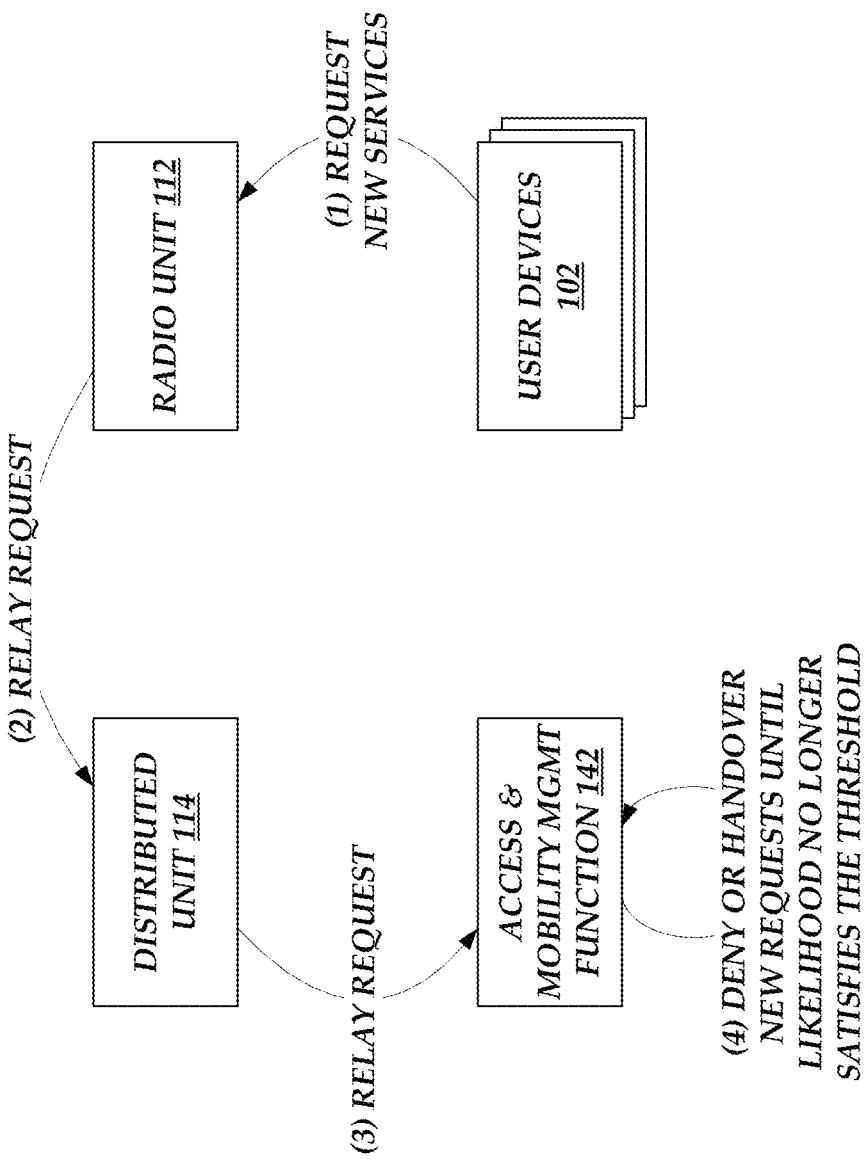
FIG. 6 is a flow diagram depicting example interactions for reducing the workload of a distributed unit in accordance with aspects of the present disclosure.

FIG. 6 is a flow diagram depicting example interactions for reducing the workload of a distributed unit 114 in accordance with aspects of the present disclosure. It will be understood that the interactions depicted in FIG. 6 are provided for purposes of example, and that many other techniques for reducing the workload of the distributed unit 114 are within the scope of the present disclosure. In the illustrated embodiment, the workload of the distributed unit 114 is reduced by the access and mobility management function 142 in response to a request from the distributed unit 114 (e.g., the request transmitted at (3) in FIG. 5). In various embodiments, the access and mobility management function 142 may reduce the workload of the distributed unit 114 by denying new requests for service from user devices 102, by accepting new requests for service but then causing a different distributed unit (not depicted in FIG. 6) to provide the requested service, or by handing over one or more existing services that the distributed unit 114 is providing to a different distributed unit. In other embodiments, as discussed in more detail below, the distributed unit 114 may reduce its workload independently of the access and mobility management function 142.

In the illustrated embodiment, at (1), one or more user devices 102 request new services from the wireless network operator by transmitting a message to the radio unit 112. For example, a user device 102 may request content from a server on the Internet, request to transmit content to a server on the Internet, initiate a voice call, or otherwise request a service or services that the distributed unit 114 would participate in providing, thereby increasing the workload of the distributed unit.

At (2), the radio unit relays the request to the distributed unit 114, which at (3) relays the request to the access and mobility management function 142. In some embodiments, the distributed unit 114 may simply drop the request rather than relaying it to the access and mobility management function 142, which may further reduce the workload of the distributed unit 114 but may provide a suboptimal user experience if the request for service is dropped without providing feedback or a response to the requesting user device 102. In other embodiments, the distributed unit 114 may allow the request to be relayed to the access and mobility management function 142, but may provide a rate-limited or otherwise throttled service if the access and mobility management function 142 grants the request.

At (4), the access and mobility management function 142 denies the request from the user device 102, and continues denying requests from user devices 102 until the likelihood that the distributed unit 114 will miss a data transmission window no longer satisfies the threshold from the interaction at (2) in FIG. 5. In some embodiments, the access and mobility management function 142 accepts the request from the user device 102, but instructs the user device 102 to handover to a different distributed unit (e.g., one that is not at risk of missing a data transmission window). The access and mobility management function 142 may, in some embodiments, continue denying or handing over requests from user devices 102 until it receives a message from the distributed unit 114 indicating that its workload has been reduced to an acceptable level and its likelihood of missing a data transmission window no longer satisfies the threshold. In other embodiments, the access and mobility management function 142 may deny or handover requests from user devices 102 for a fixed interval each time it receives a workload reduction request from the distributed unit 114, or may directly or indirectly monitor the workload of the distributed unit 114 and determine for itself whether the workload has been reduced to an acceptable level. For example, the distributed unit 114 may transmit workload information and other status information to a server in a cloud provider network, and the access and mobility management function 142 may monitor the workload of the distributed unit 114 by obtaining workload information from the cloud-based server. In further embodiments, the access and mobility management function 142 may perform various other interactions depicted in FIGS. 5 and 6 by obtaining and analyzing workload data from a server in a cloud provider network.

In some embodiments, as discussed above, the distributed unit 114 may instead reduce its workload by throttling services that the distributed unit 114 is currently providing to user devices 102. For example, the distributed unit 114 may implement a schedule that the user devices 102 use, and may limit how many spots on the schedule are allocated to a user device or devices 102. In other embodiments, the distributed unit 114 may request that the radio unit 112 identify and hand off user devices 102 that can be handed off to another radio unit.

Figure 7:
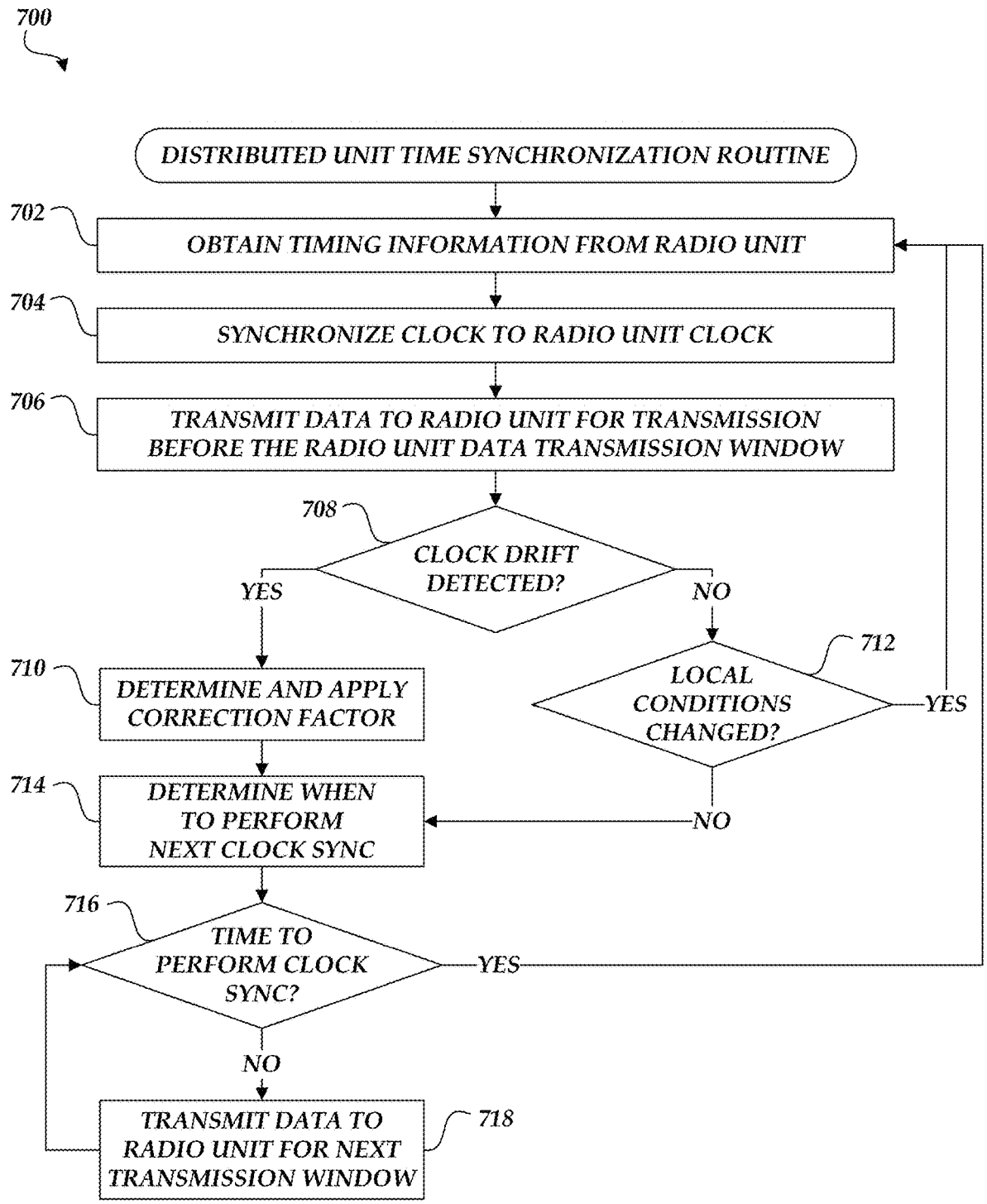
FIG. 7 is a flow chart depicting an example routine for synchronizing the clock of a distributed unit with the clock of a radio unit in accordance with aspects of the present disclosure.

FIG. 7 is a flowchart depicting an example routine 700 for synchronizing the clock of a distributed unit (e.g., the distributed unit 114 depicted in FIG. 1) in accordance with aspects of the present disclosure. The routine 700 may be carried out, for example, by a timing synchronization module (e.g., the timing synchronization module 926 depicted in FIG. 9) or by another component of the distributed unit. The routine 700 begins at block 702, where timing information may be obtained from a radio unit. As discussed above, timing information may be obtained from a radio unit in response to a request, or in some embodiments may be obtained from information that the radio unit transmits (e.g., timestamped packet headers) without an explicit request. The timing information may include, for example, hardware timestamps or other timestamps on packets that the radio unit transmits, GPS information received by the radio unit, or other information that enables synchronization with the clock of the radio unit. At block 704, the clock of the distributed unit may be synchronized to the clock of the radio unit.

At block 706, data may be transmitted from the distributed unit to the radio unit at a time that allows the radio unit to transmit the data during a defined data transmission window. As described in more detail above with reference to FIG. 2, the radio unit may transmit data to user devices during scheduled timeslots, and may thus require that the distributed unit send data to be transmitted prior to the arrival of each timeslot. The data transmission at block 706 may thus occur at a time determined after synchronizing the clocks of the distributed unit and the radio unit in order to ensure that the transmission is timely received at the radio unit.

At decision block 708, a determination may be made as to whether the clock of the distribution unit has drifted from the clock of the radio unit. If this determination cannot be made because the routine 700 does not have enough timing information (e.g., because block 702 has only been carried out once), then the routine 700 may branch to block 702 and obtain further timing information from the radio unit. If the determination at decision block 708 is that the clock of the distribution unit has drifted, then at block 710 a correction factor may be determined and iteratively applied. As described in more detail above, the correction factor may be applied on a periodic basis (e.g., once per millisecond), on an as-needed basis (e.g., when the distributed unit has data ready to send), or in accordance with other criteria. In some embodiments, as described in more detail above, block 704 may be omitted or combined with block 710. For example, the initial application of the correction factor at block 710 may cause the clocks to become synchronized.

If the determination at decision block 708 is that the clock of the distribution unit has not significantly drifted from the clock of the radio unit, then at decision block 712 a determination may be made as to whether the workload, temperature, or other local conditions at the distribution unit have changed in a manner that may cause the amount of clock drift to vary. In some embodiments, a machine learning model may be trained on historical clock drift information and used to forecast the expected clock drift. In such embodiments, the determination at decision block 708 may thus be whether the machine learning model has sufficient confidence in its prediction. If the determination at decision block 708 is that local conditions have changed and/or the amount of clock drift cannot be forecast with confidence, then the routine 700 returns to block 702, obtains updated timing information from the radio unit, and resynchronizes the clock of the distributed unit to the clock of the radio unit.

If the determination at decision block 712 is instead that local conditions remain relatively static, or after determining and applying a correction factor at block 710, the routine 700 continues at block 714, where a determination may be made as to when to request updated timing information from the radio unit and re-synchronize the clock of the distribution unit. As discussed in more detail above, the determination of when to request updated timing information may be based on factors such as radio unit workload, distribution unit workload, changes in distribution unit workload or operating temperature, variability of recent measurements of clock drift, or other factors.

At decision block 716, a determination may be made as to whether the time determined at block 714 has arrived. If so, then the routine 700 branches to block 702, where updated timing information may be obtained from the radio unit, and then iterates through blocks 704 through 714 to keep the clock of the distributed unit synchronized with the clock of the radio unit. If the determination at decision block 716 is that the time determined at block 714 has not yet arrived, then at block 718 the distributed unit may rely on its current correction factor to compensate for any clock drift, and may transmit data to the radio unit for delivery to user devices during the next data transmission window. In some embodiments, decision block 716 may be combined with decision block 712, and the determination may be as to whether either the time determined at block 714 has arrived or local conditions have changed. The routine 700 may then iterate indefinitely in order to keep the clock of the distributed unit synchronized with the clock of the radio unit.

It will be understood that FIG. 7 is provided for purposes of example, and that many variations on the illustrated routine 700 are within the scope of the present disclosure. For example, decision block 716 may be carried out after block 718. As a further example, blocks 702, 704, and 706 may be carried out several times before decision block 708 is carried out, or decision block 708 may be carried out several times before block 710 is carried out. As a still further example, block 706 may be combined with block 718, and the routine 700 may begin applying the correction factor before transmitting any data to the radio unit. Still further, in some embodiments, the routine 700 may limit how often block 702 is carried out based on factors such as the workload of the radio unit or the available bandwidth between the radio unit and the distributed unit. FIG. 7 is thus understood to be illustrative and not limiting.

Figure 8:
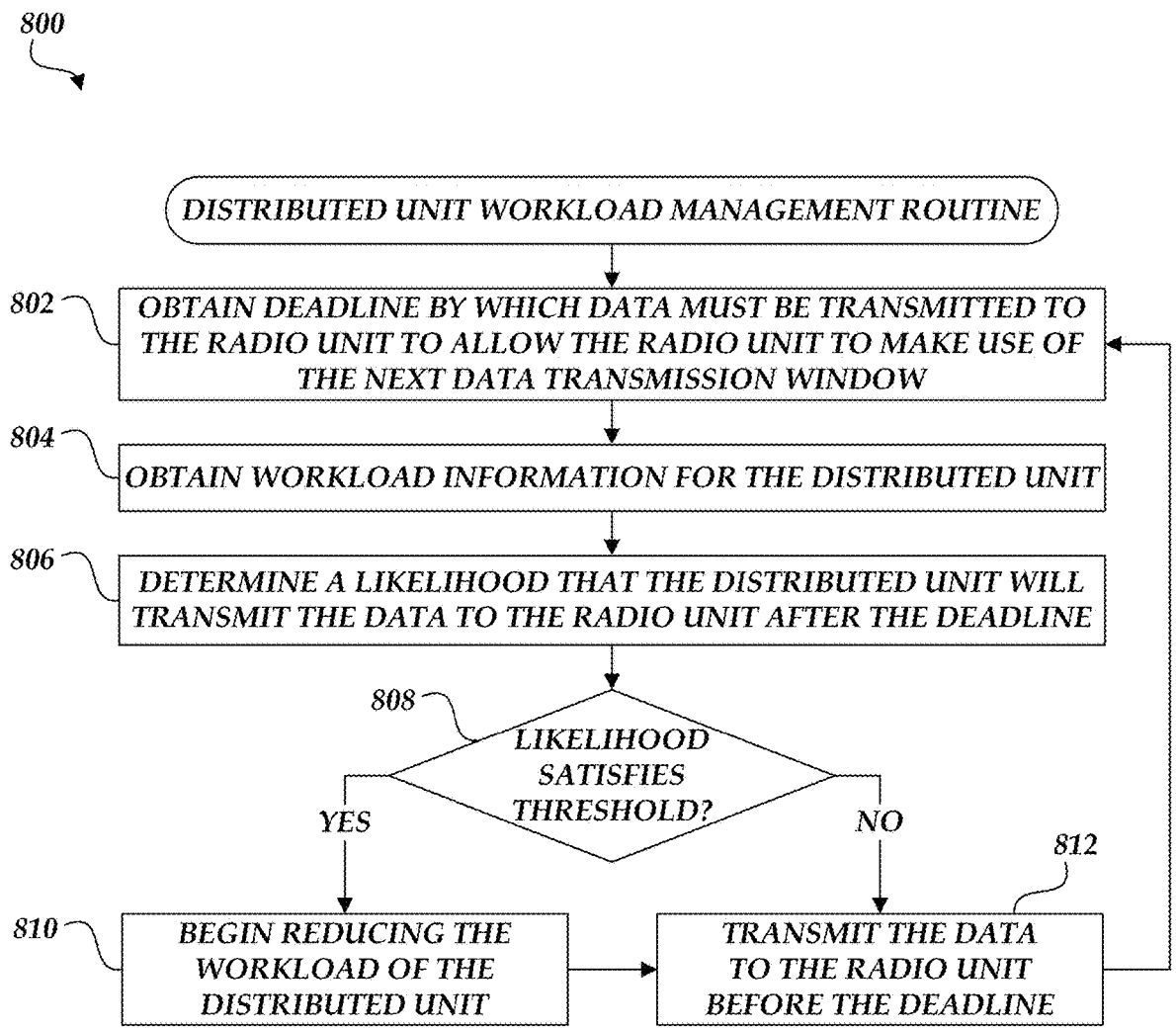
FIG. 8 is a flow chart depicting an example routine for managing the workload of a distributed unit in accordance with aspects of the present disclosure.

FIG. 8 is a flowchart depicting an example routine 800 for managing the workload of a distributed unit (e.g., the distributed unit 114 depicted in FIG. 1) in accordance with aspects of the present disclosure. The routine 800 may be carried out, for example, by a workload management module (e.g., the workload management module 928 depicted in FIG. 9) or by another component of the distributed unit. The routine 800 begins at block 802, where a time may be obtained by which data must be transmitted to a radio unit to enable the radio unit to make use of its next data transmission window. In various contexts herein, this time may be referred to as a "deadline" or as the end of a "window." Illustratively, it is possible for a distributed unit to send data to a radio unit prematurely (i.e., before the start of a window), but generally this can be prevented by waiting until the radio unit is expected to be ready to receive the next batch of data. As discussed above, the time may obtained at block 802 may correspond to the start of a radio unit data transmission window, and in some embodiments may be offset from that window by an amount of time corresponding to the time required by the radio unit to receive and process the data before transmitting it.

At block 804, workload information may be obtained for the distributed unit. As discussed in more detail above, the workload information may include metrics such as memory usage, processor usage, processor temperature, and the like, as well as information regarding the work performed by the distributed unit, such as the number of services being provided, the quantity of data transmitted or received in a given time interval, and so forth. In some embodiments, the workload information obtained at block 804 may include historical information, such as previously captured metrics or previous amounts of work performed.

At block 806, a likelihood that the distributed unit will transmit the data to the radio unit after the deadline may be determined. In some embodiments, the likelihood may be determined as a percentage or confidence level. For example, the determination may be that the distributed unit has a 5% chance of transmitting the data to the radio unit after the deadline. The determination may be made, in some embodiments, by comparing the workload information obtained at block 804 to historical workload information and historical times at which the distributed unit transmitted data to the radio unit under those workloads. For example, the distributed unit may identify 20 instances of historical workloads that are comparable to the current workload of the distributed unit, and may determine that, e.g., the distributed unit transmitted data before the deadline in 19 out of 20 of those instances. As a further example, in some embodiments, the distributed unit may use historical information determine that its workload is increasing over time and that its risk of missing the deadline is also increasing over time, although it will be understood that in many embodiments the risk of missing the deadline may increase more rapidly and non-linearly relative to the increase in workload. In some embodiments, statistical analysis (e.g., linear regression) may be used to detect trends in the historical information and determine a likelihood of missing the deadline. In other embodiments, a machine learning model trained on historical workloads and historical data transmission times may be applied to the current workload of the distributed unit and may produce a likelihood of missing the deadline as its output. Additionally, in some embodiments, statistical analysis, trend analysis, and/or machine learning may be used to forecast a likelihood that a future deadline (e.g., a deadline for hitting the timeslot after next, or more generally any deadline that follows the deadline obtained at block 802) will be missed, and this forecast may be used by the routine 800 to proactively begin reducing the workload of the distributed unit before that future deadline arrives.

In some embodiments, block 806 may be carried out by estimating a time at which the distributed unit will transmit data to the radio unit, determining a confidence level in that estimate (e.g., based on historical workloads and historical data transmission times), and then determining the likelihood that the actual time at which the distributed unit transmits data to the radio unit will be after the deadline. In further embodiments, a delta between an estimated time and the deadline may be determined instead of or in addition to a likelihood that the distributed unit will miss the deadline.

As discussed above, several other techniques for determining whether the distributed unit is at risk of missing the deadline are within the scope of the present disclosure. Additionally, in some embodiments, a likelihood or confidence level that the distributed unit will make the deadline may be determined instead of a likelihood or confidence level that the distributed unit will miss the deadline.

At decision block 808, a determination is made as to whether the likelihood that the distributed unit will miss the deadline satisfies a threshold. In some embodiments, the determination may be as to whether the likelihood of missing the deadline is above a threshold (e.g., 2%). In other embodiments, the determination may be as to whether a delta between the estimated time and the deadline is below a threshold (e.g., at least 50 nanoseconds before the deadline). In some embodiments, the reduction in distributed unit workload that would be needed to prevent the likelihood from satisfying the threshold may be quantified, based on, e.g., the size of the delta or the amount by which the likelihood exceeds the threshold.

If the determination at decision block 808 is that the likelihood satisfies the threshold (and, therefore, that the workload of the distributed unit should be reduced), then at block 810 a process for reducing the workload of the distributed unit may be initiated. The process may be initiated, for example, by carrying out the interactions depicted in FIG. 6 and causing an access and mobility management function to deny new requests for services or to redirect new or existing workload to other distributed units. It will be understood that the process of reducing the workload of the distributed unit is initiated at block 810 and carried out over time, and is typically not completed before the routine 800 continues to block 812.

If the determination at decision block 808 is that the workload of the distributed unit does not need to be reduced, or after initiating a reduction in workload at block 810, the routine 800 continues at block 812, where the data may be transmitted to the radio unit before the deadline obtained at block 802. The routine 800 then returns to block 802, and iterates for the next deadline for transmitting data to the radio unit and thereafter. In some embodiments, the routine 800 may be carried out when it is too late to prevent the distributed unit from missing the deadline, and as such block 812 may be deferred or omitted. For example, the routine 800 may be carried out as a response to the distributed unit missing a deadline, and may determine that the distributed unit will miss more deadlines before its workload can be reduced to a manageable level. In other embodiments, block 812 may be carried out immediately after block 802 or in parallel with any or all of blocks 804 through 810.

In some embodiments, as described in more detail above, blocks 802 and 812 may be carried out more frequently than the other blocks of the routine 800. For example, the workload information obtained at block 804 may be aggregated or averaged across several data transmission windows, and the routine 800 may "spot check" every tenth window. As a further example, blocks 806 and 808 may be carried out only if the workload information obtained at block 804 indicates a relatively high workload for the distributed unit (e.g., a workload that is historically associated with missed deadlines or that represents a relatively high risk of missed deadlines). It will thus be understood that FIG. 8 is provided for purposes of example, and that many variations on the depicted routine 800 are within the scope of the present disclosure.

Figure 9:
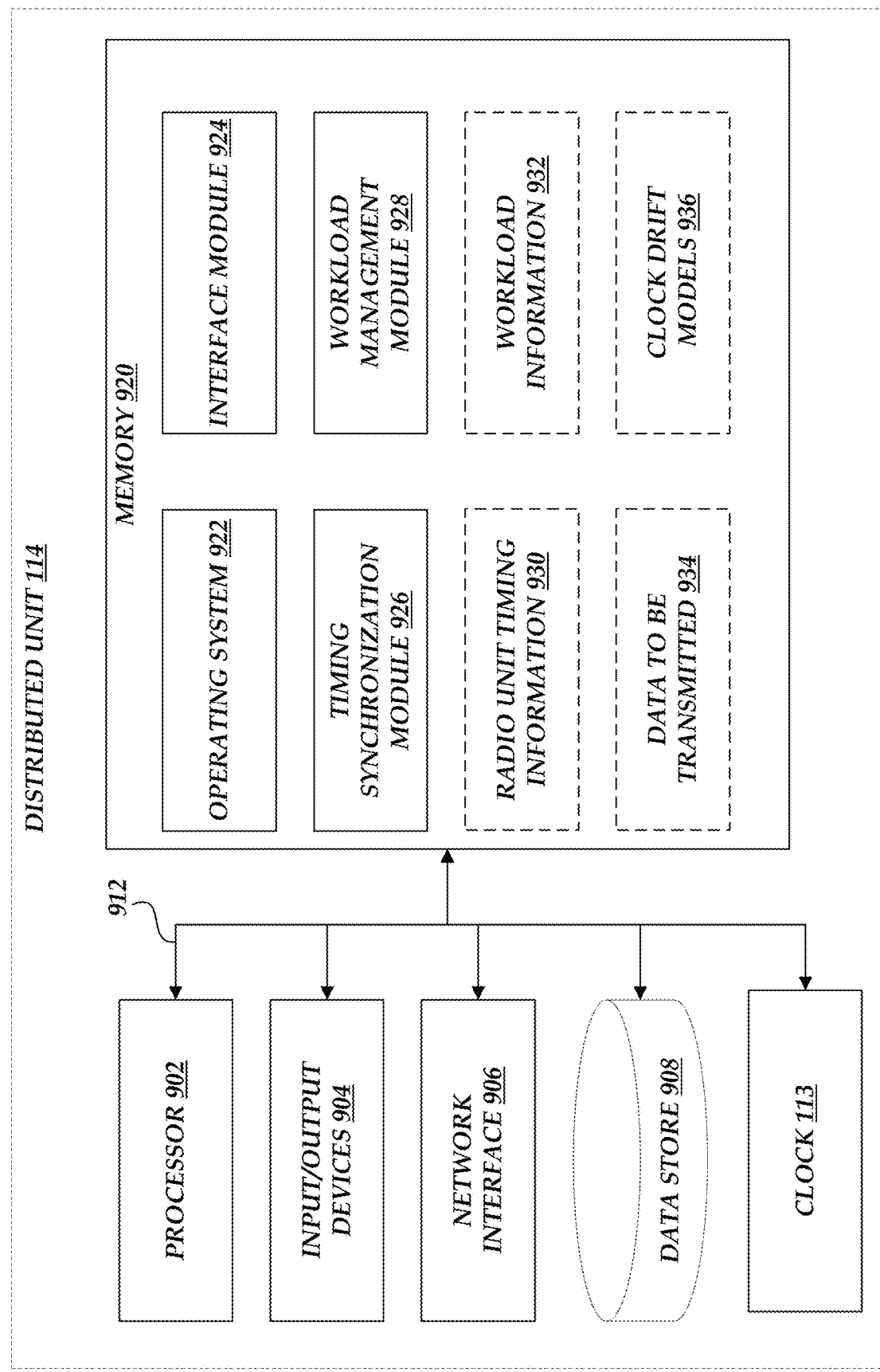
FIG. 9 is a block diagram depicting a general architecture of a computing device that is configured to implement a distributed unit that synchronizes its clock and manages its workload in accordance with aspects of the present disclosure.

FIG. 9 depicts a general architecture of a computing system (referenced as distributed unit 114) that synchronizes timing information, manages its workload, and transmits information to radio units in accordance with aspects of the present disclosure. The general architecture of the distributed unit 114 depicted in FIG. 9 includes an arrangement of computer hardware and software modules that may be used to implement aspects of the present disclosure. The hardware modules may be implemented with physical electronic devices, as discussed in greater detail below. The distributed unit 114 may include many more (or fewer) elements than those shown in FIG. 9. It is not necessary, however, that all of these generally conventional elements be shown in order to provide an enabling disclosure. Additionally, the general architecture illustrated in FIG. 9 may be used to implement one or more of the other components illustrated in FIG. 1.

As illustrated, the distributed unit 114 includes a processor 902, input/output device interfaces 904, a network interface 906, a data store 908, a clock 113, and a memory 920, all of which may communicate with one another by way of a communication bus 912. The network interface 906 may provide connectivity to one or more networks or computing systems, such the radio unit 112, centralized unit 116, or other components of the radio access network 110 depicted in FIG. 1. The processor 902 may thus receive information and instructions from other computing systems or services. The processor 902 may also provide output information for an optional display (not shown) via the input/output device interfaces 904. The input/output device interfaces 904 may also accept input from an optional input device (not shown).

The memory 920 may contain computer program instructions (grouped as modules in some embodiments) that the processor 902 executes in order to implement one or more aspects of the present disclosure. The memory 920 generally includes random access memory (RAM), read only memory (ROM) and/or other persistent, auxiliary or non-transitory computer readable media. The memory 920 may store an operating system 922 that provides computer program instructions for use by the processor 902 in the general administration and operation of the distributed unit 114. The memory 920 may further include computer program instructions and other information for implementing aspects of the present disclosure. For example, in one embodiment, the memory 920 includes an interface module 924 that generates interfaces (and/or instructions therefor) for interacting with other computing devices, e.g., via an API, CLI, and/or Web interface.

In addition to and/or in combination with the interface module 924, the memory 920 may include a timing synchronization module 926 that may be executed by the processor 902. In one embodiment, the timing synchronization module 926 implements various aspects of the present disclosure, e.g., synchronizing the clock 113 of the distributed unit 114 with a clock of a radio unit 112. While the clock 113 is shown in FIG. 9 as a separate component of the distributed unit 114, in other embodiments, all or part of the clock 113 may be implemented by other components of the distributed unit 114. For example, in certain embodiments of the present disclosure, the processor 902 may implement some or all of the functionality of the clock 113. The memory 920 may further include a workload management module 928 that may be executed by the processor 902. In one embodiment, the workload management module 928 implements various aspects of the present disclosure, e.g., managing the workload of the distributed unit 114.

The memory 920 may further include radio unit timing information 930, which is described in more detail above and may be obtained from a radio unit (e.g., the radio unit 112 depicted in FIG. 1). The memory 920 may yet further include workload information 932, which is described in more detail above and may be obtained, for example, by measuring usage of the memory 920 or the processor 902. The memory 920 may yet further include data to be transmitted 932, which, as described in more detail above, may be obtained from a centralized unit (e.g., the centralized unit 116 depicted in FIG. 1) and may be transmitted to a radio unit via the network interface 906. The memory 920 may yet further include workload information 934 for the distributed unit 114 and/or a radio unit or units that are in communication with the distributed unit 114. In some embodiments, the memory 920 may further include, e.g., clock drift models 936 (e.g., machine learning models trained to forecast changes in timing drift), data received from a radio unit, workload forecasts, historical clock drift, or other information.

In some embodiments, the distributed unit 114 may further include components other than those illustrated in FIG. 9. For example, the memory 920 may further include a workload forecasting module that forecasts the workload of the distributed unit 114, or may include user interfaces for configuring the distributed unit 114. FIG. 9 is thus understood to be illustrative but not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system comprising:
    a radio unit comprising a first processor and a clock that keeps time based at least in part on signals received from a satellite; and
    a distributed unit comprising a second processor and a clock that keeps time based at least in part on oscillations of a crystal, wherein the second processor executes computer-executable instructions to perform operations including:
        obtaining, from the radio unit, first timing information based at least in part on a first signal received from the satellite, wherein the first timing information enables synchronizing the clock of the distributed unit with the clock of the radio unit;
        synchronizing the clock of the distributed unit with the clock of the radio unit in accordance with the first timing information;
        determining, based at least in part on synchronizing the clock of the distributed unit, a first time at which to transmit first data to the radio unit, wherein transmitting the first data at the first time enables the radio unit to transmit the first data over a radio access network during a first timing window;
        transmitting the first data to the radio unit at the first time;
        obtaining, from the radio unit, second timing information based at least in part on a second signal received from the satellite, wherein the second timing information enables resynchronizing the clock of the distributed unit with the clock of the radio unit;
        determining, based at least in part on the second timing information, a drift of the clock of the distributed unit relative to the clock of the radio unit;
        determining, based at least in part on the drift of the clock of the distributed unit, a correction factor to compensate for the drift of the clock of the distributed unit;
        applying the correction factor to the clock of the distributed unit;
        determining, based at least in part on applying the correction factor to the clock of the distributed unit, a second time at which to transmit second data to the radio unit, wherein transmitting the second data at the second time allows the radio unit to transmit the second data over the radio access network during a second timing window; and
transmitting the second data to the radio unit at the second time.

2. The system of claim 1, wherein applying the correction factor to the clock of the distributed unit comprises adding or subtracting time from the clock of the distributed unit on a periodic basis.

3. The system of claim 1, wherein processor executes further computer-executable instructions to perform further operations including:
determining, based at least in part on a plurality of applications of the correction factor to the clock of the distributed unit, a third time at which to transmit third data to the distributed unit, wherein transmitting the third data at the third time allows the radio unit to transmit the third data over the radio access network during a third timing window; and
transmitting the third data to the radio unit at the third time.

4. The system of claim 1, wherein the distributed unit is implemented using an edge location of a cloud provider network.

5. The system of claim 1, wherein obtaining the first timing information comprises transmitting a request for the first timing information to the radio unit.

6. A computer-implemented method comprising:
synchronizing a first clock of a distributed unit with a second clock of a radio unit in accordance with first timing information obtained from the radio unit, wherein the first timing information enables synchronizing the first clock of the distributed unit with the second clock of the radio unit;
transmitting first data from the distributed unit to the radio unit at a first time determined based at least in part on synchronizing the second clock, wherein transmitting the first data at the first time enables the radio unit to transmit the first data over a radio access network during a first timing window;
determining, based at least in part on second timing information obtained from the radio unit, a drift of the second clock relative to the first clock, wherein the second timing information enables resynchronizing the first clock of the distributed unit with the second clock of the radio unit;
periodically applying a correction factor to the second clock, wherein the correction factor is determined based at least in part on the drift of the second clock; and
transmitting second data from the distributed unit to the radio unit at a second time determined based at least in part on applying the correction factor to the second clock, wherein transmitting the second data at the second time allows the radio unit to transmit the second data over the radio access network during a second timing window.

7. The computer-implemented method of claim 6, wherein the correction factor is determined based at least in part on one or more of processor load, processor temperature, or memory utilization.

8. The computer-implemented method of claim 6, wherein the correction factor is dynamically updated using a machine learning model that is trained to forecast clock drift.

9. The computer-implemented method of claim 6 further comprising determining a time at which to obtain third timing information from the radio unit.

10. The computer-implemented method of claim 9, wherein the time at which to obtain the third timing information from the radio unit is determined based at least in part on one or more of a workload of the radio unit, a workload of the distributed unit, a temperature of the distributed unit, a change in the workload of the distributed unit, or an estimated reliability of the correction factor.

11. The computer-implemented method of claim 6, wherein the correction factor is determined based at least in part on averaging a plurality of drifts of the second clock.

12. The computer-implemented method of claim 6, wherein the first timing information comprises a timestamp on a data packet received from the radio unit.

13. The computer-implemented method of claim 6 further comprising filtering timing information obtained from the radio unit.

14. The computer-implemented method of claim 13, wherein filtering the timing information obtained from the radio unit comprises determining that network delay caused one or more outliers.

15. The computer-implemented method of claim 13, wherein filtering the timing information obtained from the radio unit comprises one of more of removing one or more outliers, or applying weighting factors to individual data points in the timing information.

16. The computer-implemented method of claim 6 further comprising selecting the radio unit from among a plurality of radio units that are connected to the distributed unit based at least in part on respective workloads of the plurality of radio units.

17. One or more non-transitory computer-readable media storing computer-executable instructions that, when executed by a distributed unit comprising a processor, configure the distributed unit to perform operations including:
transmitting first data from the distributed unit to a radio unit at a first time determined based at least in part on synchronizing, using first timing information, a clock of the distributed unit with a clock of the radio unit, wherein the first timing information enables synchronizing the clock of the distributed unit with the clock of the radio unit, and wherein transmitting the first data at the first time enables the radio unit to transmit the first data over a radio access network during a first timing window;
applying a correction factor to the clock of the distributed unit based at least in part on second timing information obtained from the radio unit, wherein the second timing information enables resynchronizing the clock of the distributed unit with the clock of the radio unit; and
transmitting second data from the distributed unit to the radio unit at a second time determined based at least in part on applying the correction factor to the clock of the distributed unit, wherein transmitting the second data at the second time allows the radio unit to transmit the second data over the radio access network during a second timing window.

18. The one or more non-transitory computer-readable media of claim 17, wherein the first timing information obtained from the radio unit comprises a plurality of timestamps on data packets sent by the radio unit via an Enhanced Common Public Radio Interface ("eCPRI") protocol.

19. The one or more non-transitory computer-readable media of claim 17 storing further computer-executable instructions that, when executed by the processor, configure the distributed unit to perform further operations including:
synchronizing the clock of the distributed unit with the clock of the radio unit in accordance with the first timing information obtained from the radio unit.

20. The one or more non-transitory computer-readable media of claim 17 storing further computer-executable instructions that, when executed by the processor, configure the distributed unit to perform further operations including:
applying an updated correction factor to the clock of the distributed unit based at least in part on further timing information obtained from the radio unit.

21. The one or more non-transitory computer-readable media of claim 17, wherein the second timing information is obtained from the radio unit at a plurality of times.

\* \* \* \* \*